(12) United States Patent
Tee et al.

(10) Patent No.: US 9,160,489 B1
(45) Date of Patent: Oct. 13, 2015

(54) ORIGIN DODGING FOR TRANSMITTED SIGNAL

(71) Applicant: MARVELL INTERNATIONAL LTD., Hamilton (BM)

(72) Inventors: Luns Tee, Berkeley, CA (US); Swaroop Venkatesh, San Ramon, CA (US); Ankit Sethi, Maharashtra (IN)

(73) Assignee: MARVELL INTERNATIONAL LTD. (BM)

( * ) Notice: Subject to any disclaimer, the term of this patent is extended or adjusted under 35 U.S.C. 154(b) by 0 days.

(21) Appl. No.: 14/482,531

(22) Filed: Sep. 10, 2014

Related U.S. Application Data

(60) Provisional application No. 61/875,886, filed on Sep. 10, 2013.

(51) Int. Cl.
*H03C 3/00* (2006.01)
*H04L 1/00* (2006.01)
*H04L 27/20* (2006.01)
*H04B 1/04* (2006.01)

(52) U.S. Cl.
CPC ............ *H04L 1/0042* (2013.01); *H04B 1/0475* (2013.01); *H04L 27/20* (2013.01)

(58) Field of Classification Search
None
See application file for complete search history.

(56) References Cited

U.S. PATENT DOCUMENTS

2011/0305292 A1* 12/2011 Matsuura et al. ............. 375/268

* cited by examiner

*Primary Examiner* — Adolf Dsouza

(57) ABSTRACT

Systems and methods associated with origin dodging for a transmitted signal are described. One method includes receiving a transmission sequence for transmission to a receiver. The transmission sequence includes a sequence of transmit symbols and each transmit symbol corresponds to a coordinate pair positioning the transmit symbol's phase on an I-Q plane. The method includes sampling and filtering the transmission sequence to create transition samples and determining whether any transition sample is within a predetermined radius of an origin of the I-Q plane. When a transition sample is positioned within the radius, the method includes generating a dodging symbol and inserting the dodging symbol into the transmission sequence to create a modified transmission sequence. A filtered signal that includes filtered samples of the modified transmission sequence is provided.

17 Claims, 9 Drawing Sheets

Prior Art Filter

ORIGIN DODGING FOR TRANSMITTED SIGNAL

CROSS REFERENCE TO RELATED APPLICATIONS

This patent disclosure claims the benefit of U.S. Provisional Application Ser. No. 61/875,886 filed on Sep. 10, 2013, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Near field communication (NFC), such as Bluetooth, often uses phase-shift keying (PSK) to communicate symbols. A PSK symbol's phase correlates to a particular symbol (e.g, in D8PSK, 45 degrees corresponds to 110, 90 degrees corresponds to 010, and so on). Constellation diagrams are used to represent PSK symbols in the I-Q plane based on the symbols' real and imaginary components. In the constellation diagram, the real component is graphed along the I axis and the imaginary component is graphed along the Q axis. Before a signal corresponding to a succession of PSK symbols is transmitted, the signal is filtered to so that the transmitted signal transitions smoothly from one symbol to the next.

SUMMARY

In general, in one aspect this specification discloses an apparatus. The apparatus includes origin dodging logic configured to receive a transmission sequence for transmission to a receiver. The transmission sequence includes a sequence of transmit symbols and each transmit symbol corresponds to a coordinate pair positioning the transmit symbol's phase on an I-Q plane. The apparatus is configured to sample and filter the transmission sequence to create transition samples and determine whether any transition sample is within a predetermined radius of an origin of the I-Q plane. When a transition sample is positioned within the radius, the apparatus is configured to generate a dodging symbol and insert the dodging symbol into the transmission sequence to create a modified transmission sequence. The modified transmission sequence is filtered and sampled to produce filtered samples. A filtered signal that includes the filtered samples is provided.

In general, in another aspect, this specification discloses a method for performing origin dodging in a transmitted signal. The method includes receiving a transmission sequence for transmission to a receiver. The transmission sequence includes a sequence of transmit symbols and each transmit symbol corresponds to a coordinate pair positioning the transmit symbol's phase on an I-Q plane. The method includes sampling and filtering the transmission sequence to create transition samples and determining whether any transition sample is within a predetermined radius of an origin of the I-Q plane. When a transition sample is positioned within the radius, the method includes generating a dodging symbol and inserting the dodging symbol into the transmission sequence to create a modified transmission sequence. A filtered signal that includes filtered samples of the modified transmission sequence is provided.

In general, in another aspect, this specification discloses a device for performing origin dodging in a transmitted signal. The device includes first and second integrated circuits. The first integrated circuit is configured to receive a transmission sequence for transmission to a receiver. The transmission sequence includes a sequence of transmit symbols, and each transmit symbol corresponds to a coordinate pair positioning the transmit symbol's phase on an I-Q plane. The first integrated circuit is configured to sample and filter the transmission sequence to create transition samples and determine whether any transition sample is within a predetermined radius of an origin of the I-Q plane. When a transition sample between a first transmit symbol and a second transmit symbol is positioned within the radius, the first integrated circuit is configured to generate a dodging symbol and insert the dodging symbol into the transmission sequence between the first transmit symbol and the second transmit symbol to create a modified transmission sequence. The first integrated circuit is configured to produce filtered samples based, at least in part, on the modified transmission sequence and create a filtered signal that includes the filtered samples. The second integrated circuit is configured to transmit the filtered signal.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

The filtered signal derived from a succession of transmit symbols is, by design, smooth on the I-Q plane. However, when the filtered signal passes near the origin, the filtered signal can have abrupt jumps in phase and amplitude. When consecutive transmit symbols differ by a phase of 180 degrees, the filtered signal corresponding to the consecutive transmit symbols will cross near the origin of the I-Q plane. Later stages of the transmit path, such as the power amplifier can have difficulties tracking these abrupt changes and can generate unwanted distortion, both in the transmit channel as well as in adjacent channels.

Described herein are examples of systems, methods, and other embodiments associated with adjusting a filtered signal that encodes transmit symbols so that the filtered signal does not cross through or near an origin of the I-Q plane. The adjustments made to the filtered signal avoid abrupt phase and amplitude changes associated with crossing near the origin, thus preventing the creation of distortion in later stages of the transmitter. This intentional distortion of the filtered signal may be preferable over downstream distortions which can be more severe and harder to predict or mitigate. The adjustments to the filtered signal described herein can be introduced in the transmit channel or placed in adjacent channels, or some combination of the two.

Figure 1A:
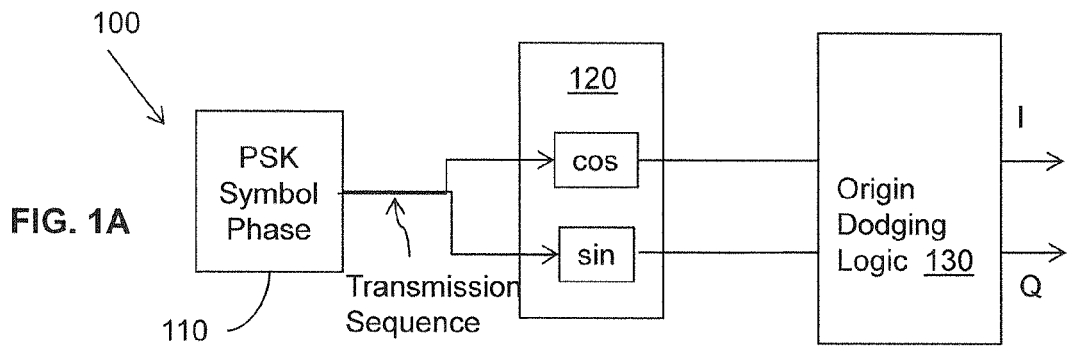
FIG. 1A illustrates one embodiment of an apparatus associated with origin dodging for a transmitted signal.

With reference to FIG. 1A, one embodiment of an apparatus 100 is shown that is associated with origin dodging for transmitted signals. The apparatus 100 may be implemented in a network communication device that includes a transmitter (not shown) that transmits the filtered signal output by the apparatus 100. In one embodiment, the apparatus 100 is implemented on a chip including one or more integrated circuits configured to perform one or more of the functions described herein.

The apparatus 100 processes a transmission sequence of PSK symbols from a symbol source 110. In one embodiment, the symbol source 110 is a DPSK symbol source followed by an accumulator. Each symbol corresponds to the phase of a PSK symbol that is being transmitted, referred to hereinafter as a "transmit symbol". As discussed above, the phase of each PSK symbol communicates a selected one of several possible PSK symbols. In one embodiment, the PSK symbols are enhanced data rate 3 (EDR3) symbols.

A translation block 120 translates the transmit symbols into real and imaginary coordinates that can be used to plot the samples on the I-Q plane. The cosine block outputs the real component, also referred to as the "I" component and the sine block outputs the imaginary component, also referred to as the "Q" component. The sequence of translated transmit symbols (known hereinafter as the "transmission sequence") is sampled and filtered to produce a sequence of "filtered samples" that define the filtered signal. Thus the filtered signal defines a trajectory of the transitions between the transmit symbols. A filtered sample that is part of the trajectory between a first and second transmit symbols is referred to herein as being "between" the first and second transmit symbols.

The real components and the imaginary components of the translated transmit symbols are input to origin dodging logic 130 that, in essence, inserts dodging symbols into the sequence of transmit symbols, when deemed necessary, so that the filtered signal that is output by the apparatus 100 does not cross the origin of the I-Q plane. The origin dodging logic 130 is configured to determine whether the filtered signal will fall within a predetermined radius of the origin of the constellation diagram.

When the filtered signal will be positioned within the radius, the origin dodging logic 130 is configured to generate a dodging symbol that, when inserted between the transmit symbols prior to filtering, will displace the filtered signal outside the radius. In one embodiment, the dodging logic 130 combines samples of the dodging symbol with the transmission sequence and creates a modified filtered signal based on the combination of dodging symbol samples and the transmit symbol samples. The addition of the dodging symbol samples to the transmission sequence displaces the trajectory of the filtered signal away from the origin.

Figure 1B:
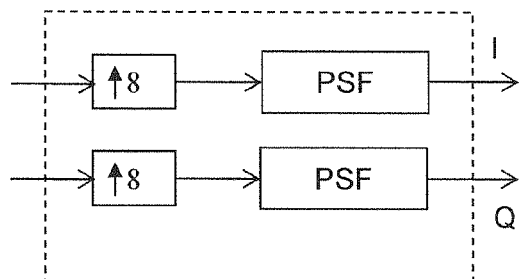
FIG. 1B illustrates a prior art filter used to filter a transmitted signal.

FIG. 1B illustrates a prior art filter that does not adjust the filtered signal to avoid origin crossings. The prior art filter would be in place of the dodging logic 130 shown in FIG. 1A. The prior art filter includes an upsampling block and a pulse shape filter (PSF) for the I and Q components. The output of the prior art filter is the filtered signal, which will be susceptible to origin crossings.

Figure 1C:
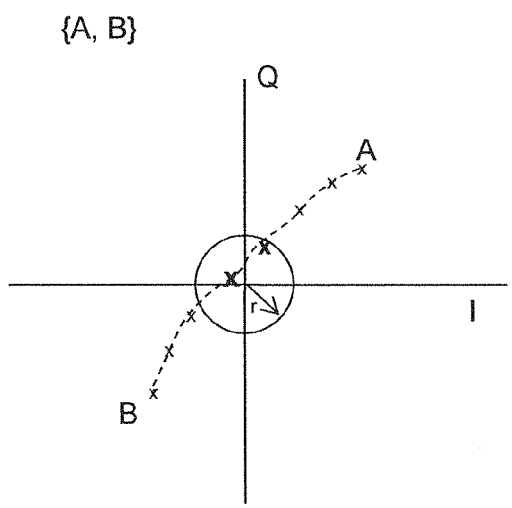
FIG. 1C illustrates an I-Q plane plot depicting a filtered signal corresponding to a transition between two PSK symbols that are separated by 180 degrees.
Figure 1D:
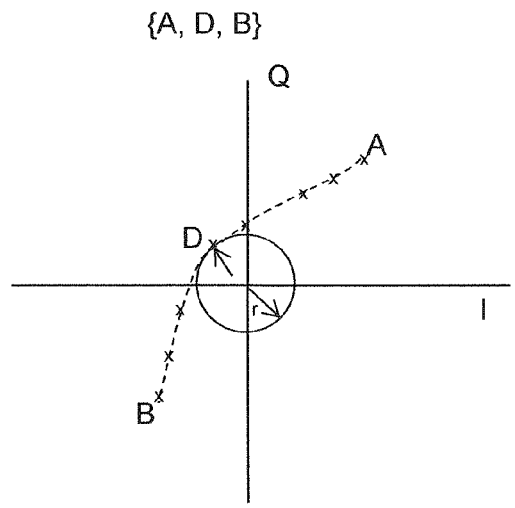
FIG. 1D illustrates an I-Q plane plot depicting the filtered signal of FIG. 1C as adjusted by the origin dodging technique disclosed herein.

FIG. 1C illustrates filtered samples that result from two consecutive symbols {A,B} that differ in phase by 180 degrees. The x's represent filtered samples and the dashed line illustrates the trajectory of the filtered signal as defined by the filtered samples. It can be seen that at least one of the filtered samples indicated by a bold x) is positioned near the origin of the I-Q plane. FIG. 1D illustrates a trajectory of a modified filtered signal that results from injecting a dodging symbol "D" between transmit symbols A and B to generate the filtered samples. In the modified filtered signal, the near-origin samples in the original filtered signal no longer fall near the origin. The origin dodging logic 130 is configured to output the modified filtered signal for transmission to a receiver.

Figure 2:
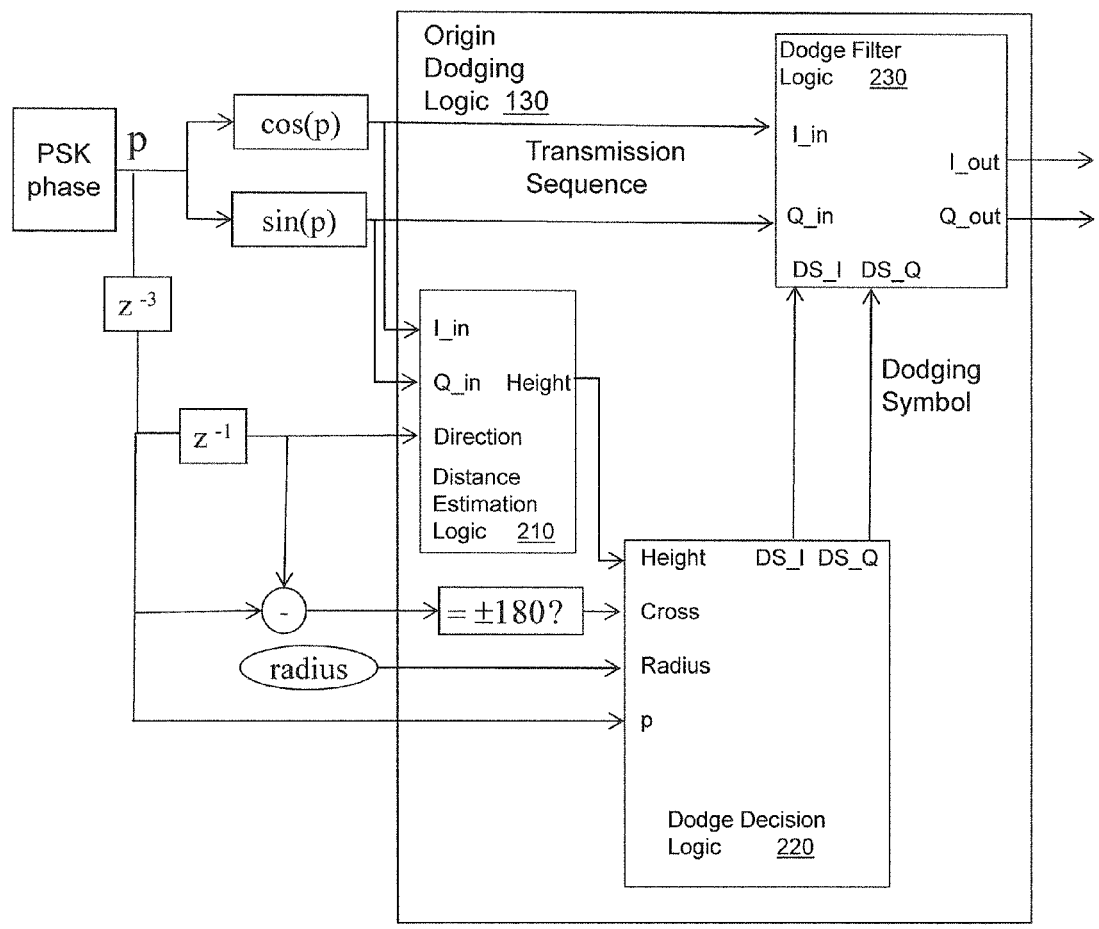
FIG. 2 illustrates one embodiment of origin dodging logic.

FIG. 2 illustrates one embodiment of the origin dodging logic 130. The origin dodging logic 130 includes distance estimation logic 210, dodge decision logic 220, and dodge filter logic 230. As will be described in more detail with reference to FIG. 3, the distance estimation logic 210 inputs the real and imaginary components of the transmission sequence as well as the direction of the trajectory of the transmission sequence. The distance estimation logic 210 samples an interval between transmit symbols to produce transition samples. The distance estimation logic 210 determines a distance between the origin and a transition sample that comes closest to the origin and outputs that distance as the variable "height."

As will be described in more detail with reference to FIG. 4, the dodge decision logic 220 inputs the height and a predetermined and/or programmable radius that defines a region around the origin where filtered samples should not fall. The dodge decision logic 220 also has an optional "cross" input that communicates whether the phase difference between consecutive samples is 180 degrees. The dodge decision logic 220 inputs the phase of the transmitted symbols "p" to be used to determine a phase of the trajectory of the filtered signal. The phase of the trajectory is used to determine which direction to rotate the phase of a transition sample to create a dodging symbol. The dodge decision logic 220 generates and outputs real and imaginary components of a dodging symbol that is added "between" consecutive transmit symbols when a filtered signal will fall too close to the origin.

As will be described in more detail with reference to FIG. 5, the dodge filter logic 230 inputs the real and imaginary components of the transmission sequence and the real and imaginary components of the dodging symbol. The dodge filter logic 230 combines the transmission sequence and the dodging symbol, filters the combination, and outputs this modified filtered signal that will be transmitted to the receiver.

Figure 3:
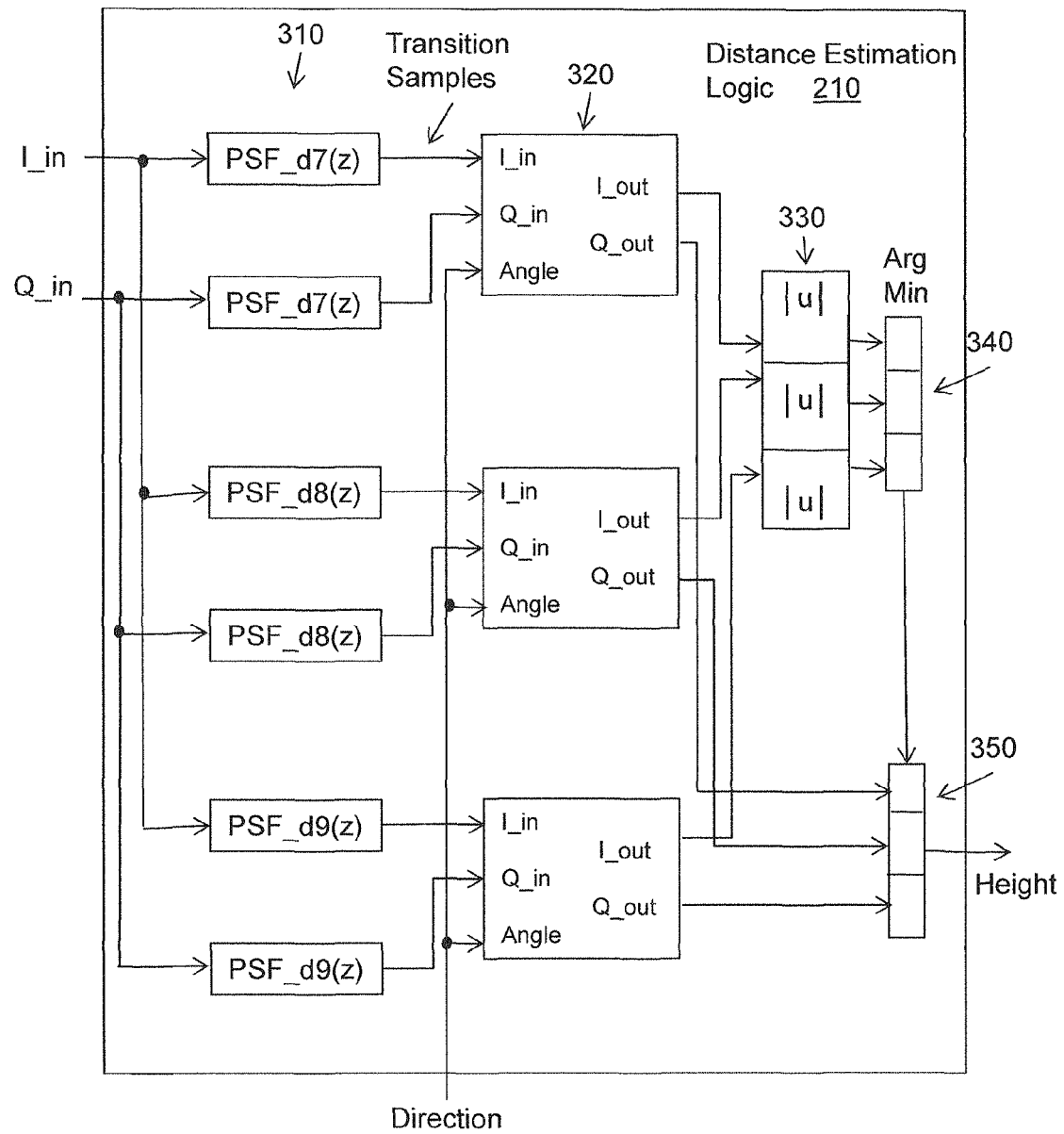
FIG. 3 illustrates one embodiment of distance estimation logic.

Referring now to FIG. 3, one embodiment of the distance estimation logic 210 is illustrated. The distance estimation logic 210 includes three PSF filters 310, such as square root raised cosine (SRRC) filters. The filters 310 are similar to the PSFs in the dodge filter logic 230 and thus the output of the filters 310 reflects the output of the PSFs in the dodging filter 230 at the "middle" of each interval between pairs of consecutive symbols in transmission sequence (e.g, in the illustrated embodiment, the filters 310 sample the transmission sequence at 7/16, 8/16, and 9/16$^{th}$ of the time interval between each pair of transmit symbols) to produce transition samples. This middle portion of the interval between consecutive symbols is selected because it is this portion of the interval that will include the filtered samples that pass closest to the origin. In other embodiments, the other portions of the interval or the entire interval may be sampled and filtered by the filters 310. In this manner, the filters 310 "predict" the middle portion of the filtered signal that result if origin dodging were not performed, so that a determination can be made as to whether any of the filtered samples in the filtered signal will pass too close to the origin.

Rotation blocks 320 input the filtered real and imaginary components of the samples (e.g., the "trajectory" of transition samples) and the phase of a prior symbol (e.g., the direction input, see FIG. 2). The rotation blocks 320 rotate the transition samples by the phase of the prior symbol so that the trajectory of transition samples lies parallel to the real axis. The minimum distance is presumed to be the rotated transition sample having a real component that falls nearest the imaginary axis. Thus, the real components of transition samples are output to absolute value blocks 330 and a comparator 340 that identifies the rotation block that output the lowest real component. The imaginary component output by the identified rotation block is selected by a selector 350 and output as the "height" by the distance estimation logic 210. Thus, the height corresponds to the imaginary component of the closest rotated transition sample in the trajectory to the origin.

Figure 4:
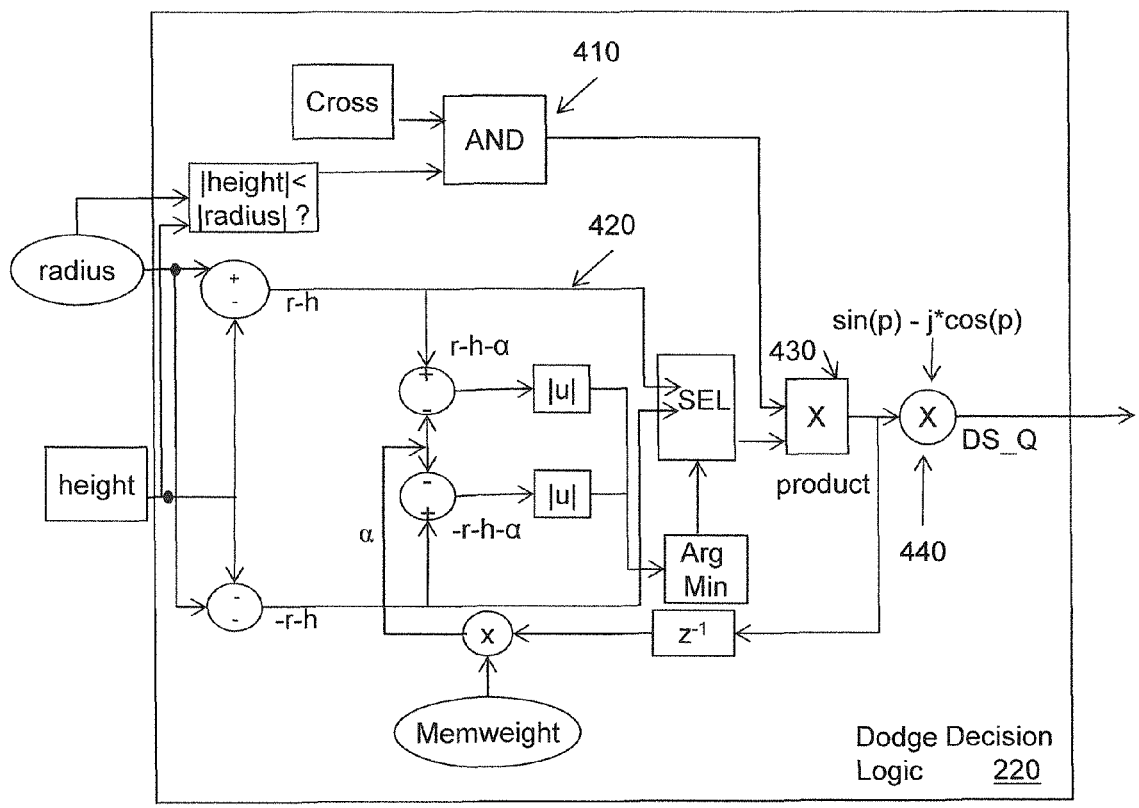
FIG. 4 illustrates one embodiment of dodge decision logic.

FIG. 4 illustrates one embodiment of the dodge decision logic 220. The dodge decision logic 220 inputs the height determined by the distance estimation logic 210 and the value of the programmable radius parameter that may be set by a user. The height will be used to generate a dodging symbol (DS) that lies at +/−90 degrees to the original trajectory of the symbol samples evaluated by the distance estimation logic 210. The decision whether to rotate +90 degrees or −90 degrees is based on which direction requires the minimum magnitude to get the trajectory of filtered samples outside the radius. The effect of prior dodging symbols may be taken into account in this decision.

In the illustrated embodiment, the dodge decision logic 220 is enabled by AND logic 410 that outputs a value of one when the distance is less than the radius and there is a difference of 180 degrees between consecutive transmit symbols (e.g., indicating that an origin crossing will likely occur). In other embodiments, the dodge decision logic may be enabled whenever the height is less than the radius, and no check is made as to whether there is a difference of 180 degrees between the first transmit symbol and the second transmit symbol. When the enabling criteria (or criterion) are met, the dodge decision logic 220 will output real and imaginary components of a dodging symbol to be inserted into the transmission sequence.

The dodge decision logic 210 includes logic 420 that determines which direction to rotate the phase of the transition sample trajectory to generate the dodging symbol. The logic 420 determines which of the two quantities r-h-α or −r-h-α is smaller, where a is the residual effect that a dodging symbol inserted into the previous interval has in the current interval. The parameter "memweight" is a programmable parameter memory weight that specifies how much affect a prior value of the minimum is given when determining the minimum. By determining the minimum of r-h-α and −r-h-α, the dodge decision logic 220 is determining on which side of the origin to put the dodging symbol or, in other words, which way to rotate the phase of a transmit symbol to minimize differential error vector magnitude. When the value of the AND circuit is 1 (e.g., indicating that an origin crossing is present), by virtue of a PRODUCT operation 430, the minimum of r-h-α and −r-h-α is output to a rotation operation 440 that rotates the minimum by 90 degrees (note that "p" is the phase of the transmit symbol as can be seen in FIG. 2). The output dodging symbol corresponds to a symbol at a distance the minimum of r-h-α and −r-h-α rotated by 90 degrees from the phase of the trajectory between the transmit symbols.

Figure 5A:
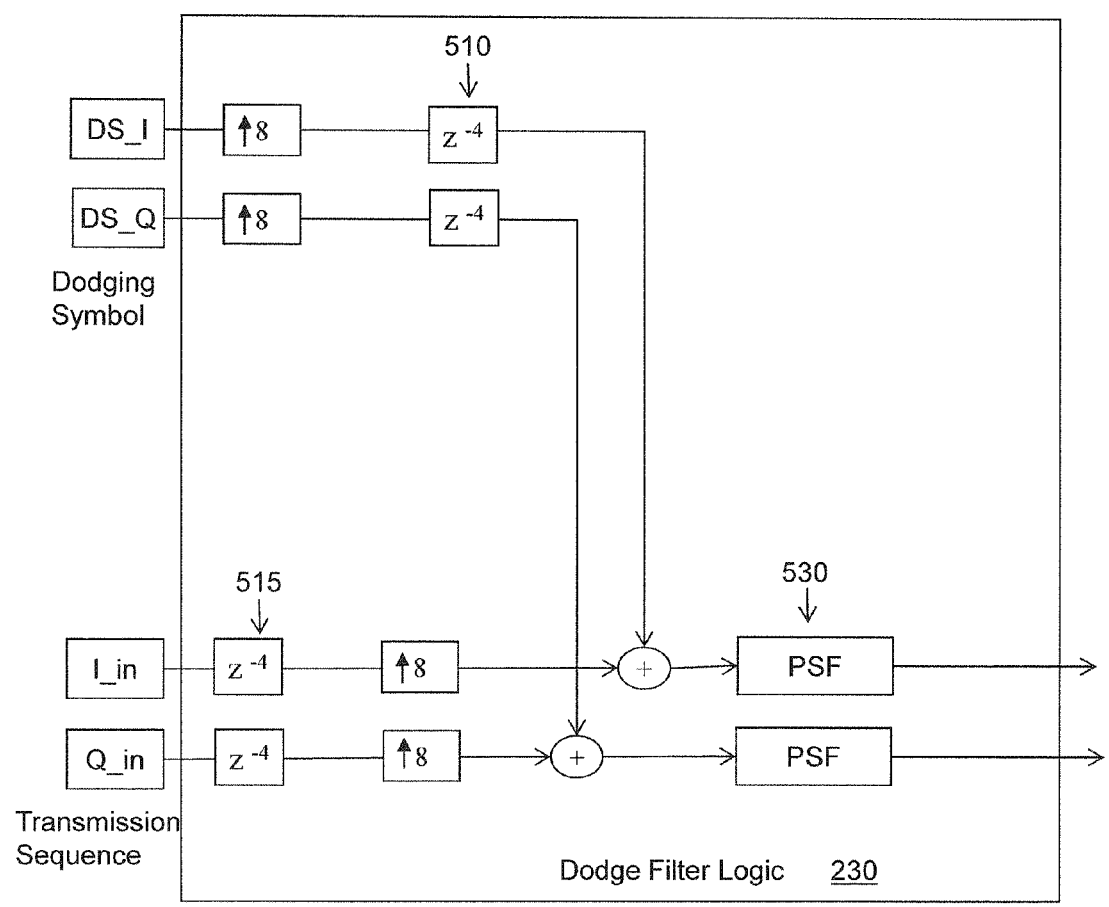
FIGS. 5A, 5B, 5C illustrate alternative embodiments of dodge filter logic.

FIG. 5A illustrates one embodiment of the dodge filter logic 230. The dodge filter logic 230 outputs the modified filtered signal that results from the injection of samples of the dodging symbol into samples of the transmission sequence. The dodge filter logic 230 includes a first upsample and delay block 510 that first upsamples to a filter rate (e.g., times 8 in the illustrated embodiment) and then delays by half a symbol period (e.g., 4 in the illustrated embodiment) the real and imaginary components of the dodging symbol. The dodge filter logic 230 includes a second upsample and delay block 515 that first delays by some predetermined period (e.g., 4 was selected as the delay period in the illustrated embodiment to balance the delay of deciding on and creating a dodging symbol) and then upsamples to the filter rate the real and imaginary components the transmit symbols in the transmission sequence. The relative position of the delay elements in the upsample and delay blocks 510, 515 places the dodging symbol samples in between the samples in the transmission sequence. This combined sequence of samples is filtered by PSFs 530, resulting in a filtered signal that lies in the transmit channel and that avoids the origin as shown in FIG. 1D. In one embodiment, the PSF 530 is an SRRC filter.

Figure 5B:
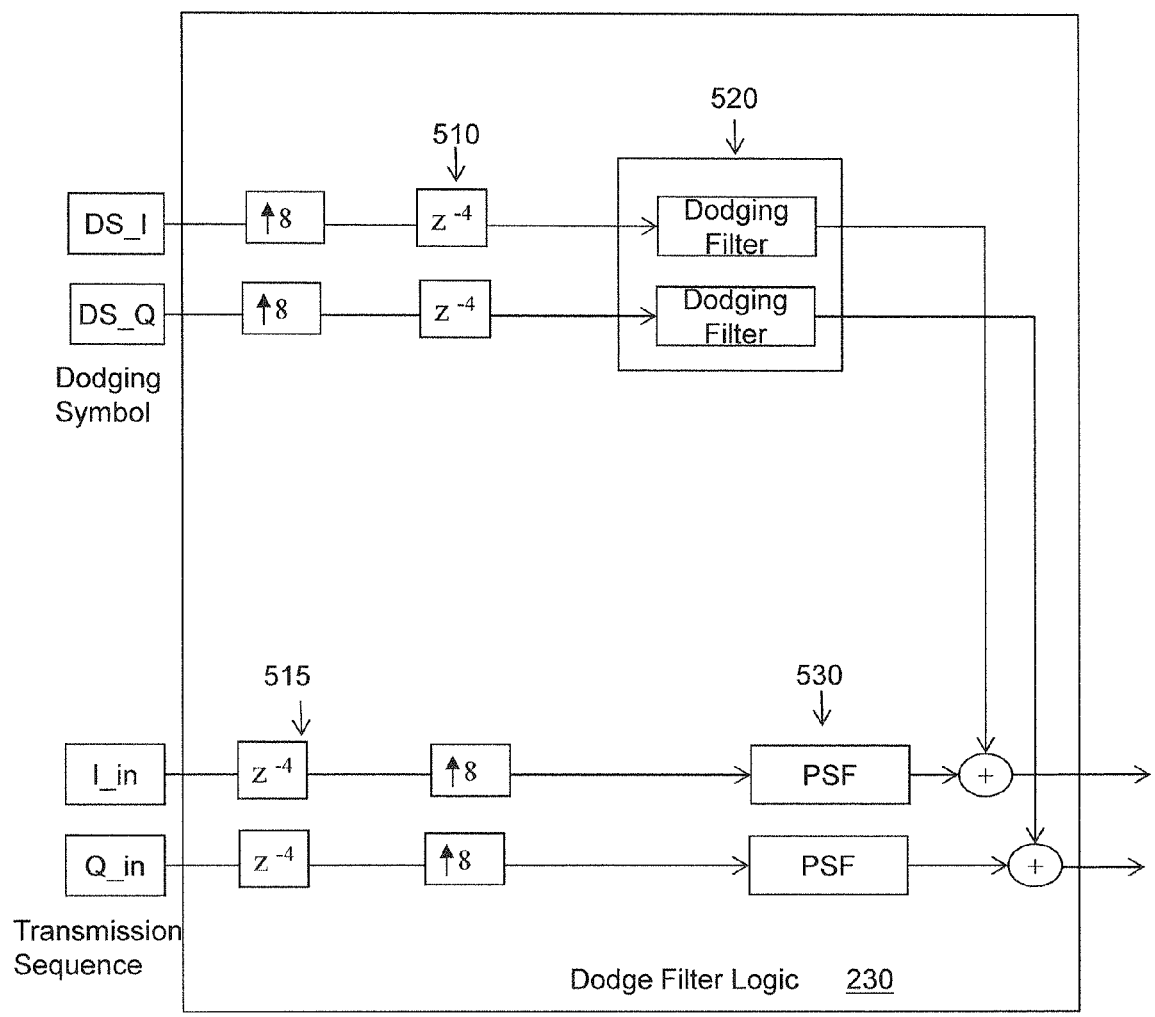

FIG. 5B illustrates another embodiment of the dodge filter logic 230. In this embodiment, a separate dodge filter 520 filters the dodging symbol samples and the filtered dodging symbol samples are then combined with the filtered transmission sequence samples to produce the modified filtered signal. The dodge filter 520 can be selected to have an attenuated response in-channel, and to have a majority of passband in adjacent channels.

Figure 5C:
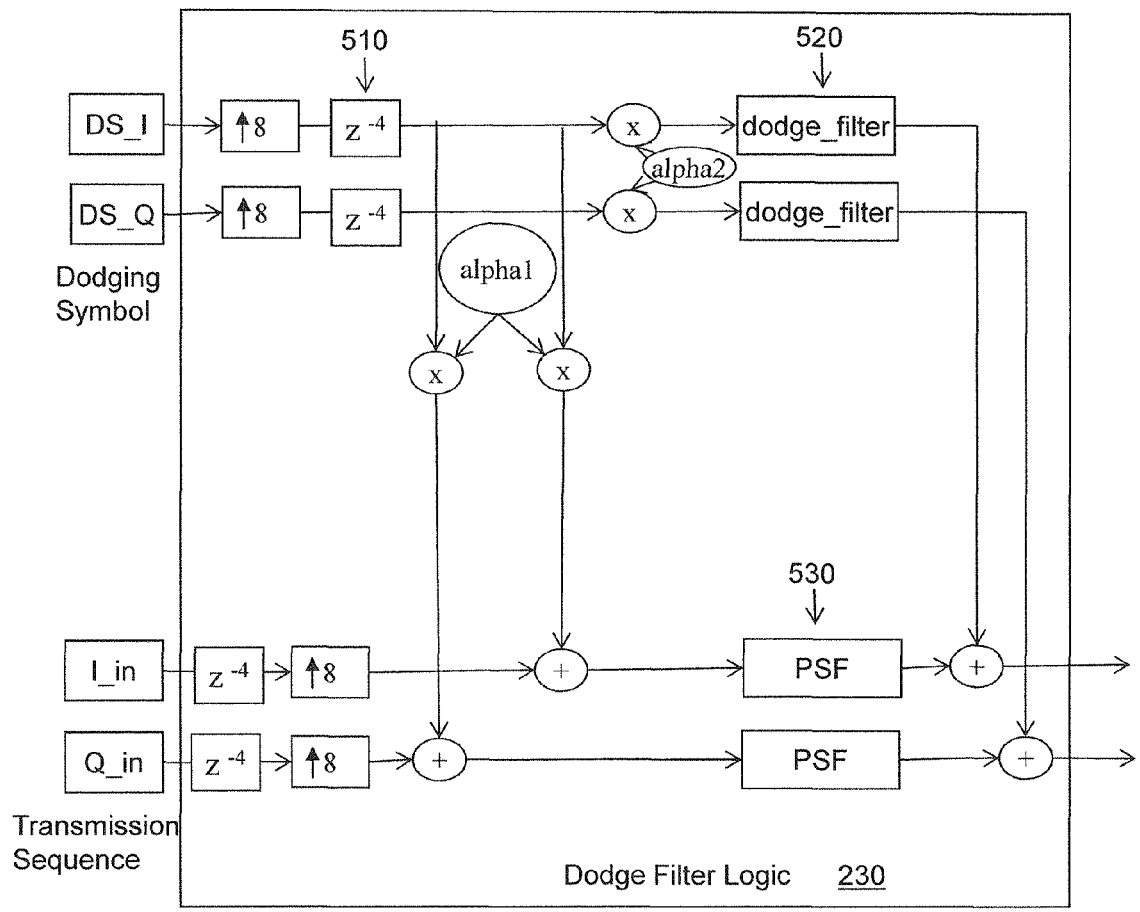

FIG. 5C illustrates another embodiment of the dodge filter logic 230. To balance in-channel and adjacent channel distortion, the dodge filter's response is parameterized according to programmable parameters alpha1 and alpha2. In this embodiment, a first proportion of the dodging symbol (as determined by alpha1) is sent to the transmit channel and a second proportion of the dodging symbol (as determined by alpha2) is sent to the adjacent channels.

Figure 6:
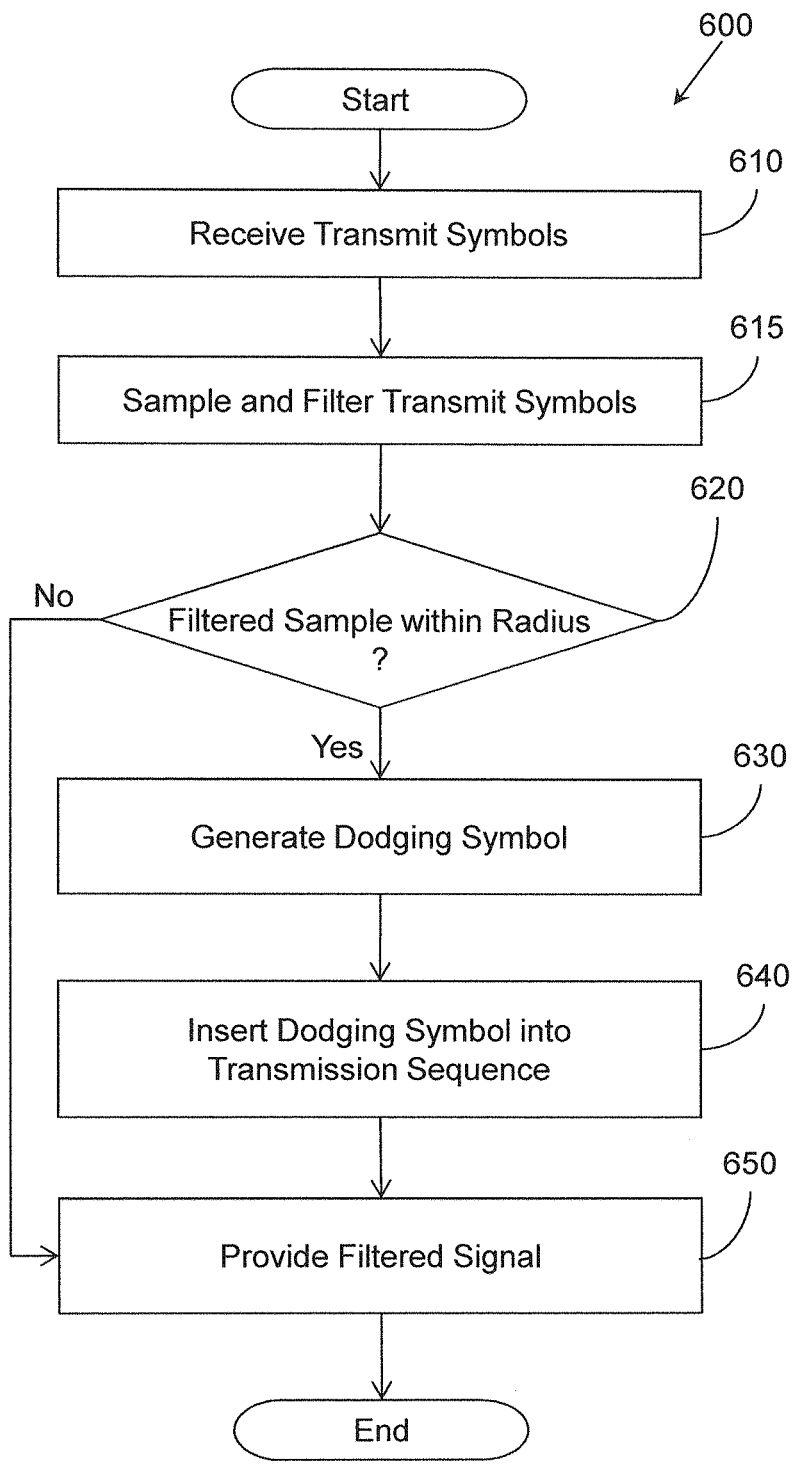
FIG. 6 illustrates one embodiment of a method associated with origin dodging for a transmitted signal.

FIG. 6 illustrates one embodiment of a method 600 for performing origin dodging to reduce power leakage caused by origin crossing in a transmitted filtered signal. The method 600 includes, at 610, receiving a transmission sequence for transmission to a receiver. The transmission sequence includes a sequence of transmit symbols and each transmit symbol corresponds to a coordinate pair positioning the transmit symbol's phase on an I-Q plane. At 615, the method includes sampling and filtering the transmission sequence to create transition samples. At 620, the method includes determining whether any transition sample is within a predetermined radius of an origin of the I-Q plane. If no transition sample is within the radius, the method continues to 650 where a filtered signal is provided for transmission.

When a transition sample is positioned within the radius, at 630 the method includes generating a dodging symbol and at 640 inserting the dodging symbol into the transmission sequence to create a modified transmission sequence. At 650, a filtered signal that includes filtered samples of the modified transmission sequence is provided.

Figure 7:
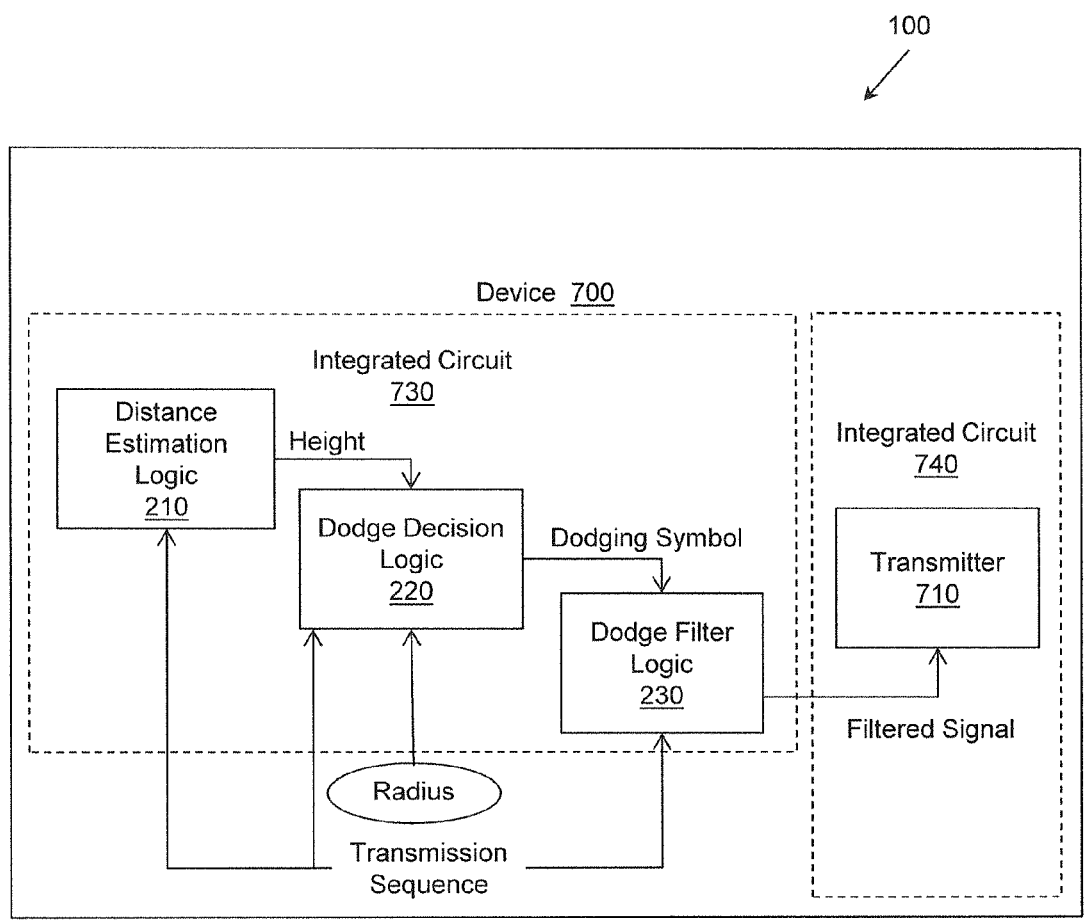
FIG. 7 illustrates one embodiment of a device associated with origin dodging for a transmitted signal.

FIG. 7 illustrates one embodiment of a device 700 that performs origin dodging to reduce power leakage of a transmitted signal into adjacent channels. In one embodiment, the device 700 embodies the apparatus 100 illustrated in FIGS. 1-5. For clarity, the logics of FIGS. 2-5 are illustrated in FIG. 7 as part of the first integrated circuit 730. In some embodiments, the various logics could be distributed in several integrated circuits or implemented on an integrated circuit that also performs other functions.

The device 700 includes a first integrated circuit 730 and a second integrated circuit 740. The first integrated circuit 730 is configured to input a transmission sequence for transmission to a receiver, wherein the transmission sequence includes a sequence of transmit symbols, wherein each transmit symbol corresponds to a coordinate pair positioning the transmit symbol's phase on an I-Q plane. The first integrated circuit 730 is configured to sample and filter the transmission sequence to create transition samples. The first integrated circuit 730 is also configured to input a programmable radius defining a region around an origin of the I-Q plane in which the filtered signal should not be positioned.

The first integrated circuit 730 is configured to identify a transition sample that falls within the region and when a transition sample falls within the region, generate a dodging symbol. The first integrated circuit 730 is configured to insert the dodging symbol into the transmission sequence between the first transmit symbol and the second transmit symbol to create a modified transmission sequence; produce filtered samples based, at least in part, on the modified transmission sequence; and create a filtered signal that includes the filtered samples.

The second integrated circuit 740 includes a transmitter 710 that is configured to transmit the filtered signal.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. An apparatus, comprising:
 origin dodging logic configured to:
  receive a transmission sequence for transmission to a receiver, wherein the transmission sequence includes a sequence of transmit symbols, wherein each transmit symbol corresponds to a coordinate pair positioning the transmit symbol's phase on an I-Q plane;
  determine whether a difference in phase between consecutive transmit symbols is 180 degrees;
  in response to determining that the difference in phase is 180 degrees:
   sample and filter the transmission sequence to create transition samples;
   determine whether any transition sample is within a predetermined radius of an origin of the I-Q plane;
   when the difference in phase is 180 degrees and a transition sample is positioned within the radius:
    generate a dodging symbol; and
    insert the dodging symbol into the transmission sequence to create a modified transmission sequence; and
    sampling and filtering the modified transmission sequence to produce filtered samples; and provide a filtered signal that includes the filtered samples for transmission to a receiver.

2. The apparatus of claim 1, wherein the origin dodging logic comprises distance estimation logic configured to:
sample and filter the transmission sequence during a predetermined interval between a pair of consecutive transmit symbols to produce a trajectory of transition samples;
rotate the trajectory so that the trajectory is parallel to the I axis;
identify a transition sample having the minimum distance from the Q axis; and
output the imaginary component of the identified transition sample as an estimate of the minimum distance between the origin and the trajectory of transition samples.

3. The apparatus of claim 1 wherein the origin dodging logic is configured to determine whether to generate a dodging symbol based, at least in part, a residual effect of a prior dodging symbol.

4. The apparatus of claim 1, wherein the transition samples comprise coordinate pairs having a real component and an imaginary component, and further wherein the origin dodging logic comprises dodge decision logic configured to generate the dodging symbol by:
determining a first distance from the origin in which a dodging symbol oriented at 90 degrees with respect to the trajectory needs to be located to displace the filtered signal outside the radius;
determining a second distance from the origin in which a dodging symbol oriented at −90 degrees with respect to the trajectory needs to be located to displace the filtered signal outside the radius;
selecting an orientation of 90 degrees or −90 degrees that yields the smaller distance; and
outputting a dodging symbol having a magnitude of the smaller distance at the selected orientation.

5. The apparatus of claim 1, wherein the origin dodging logic comprises dodge filter logic configured to:
insert samples of the dodging symbol into a sequence of samples of the transmission sequence to create the modified transmission sequence;
filter the modified transmission sequence with a first filter; and
output the filtered modified transmission sequence as the filtered signal.

6. The apparatus of claim 1, wherein the dodge filter logic is configured to:
filter samples of the transmission sequence with a first filter to produce a first output;
filter samples of the dodging symbol with a second filter to produce a second output; and
combine the first output with the second output to produce the filtered signal.

7. A method, comprising:
receiving a transmission sequence for transmission to a receiver, wherein the transmission sequence includes a sequence of transmit symbols, wherein each transmit symbol corresponds to a coordinate pair positioning the transmit symbol's phase on an I-Q plane;
determining whether a difference in phase between consecutive transmit symbols is 180 degrees;
in response to determining that the difference in phase is 180 degrees:
sampling and filtering the transmission sequence to create a trajectory of transition samples;
determining whether any transition sample is within a predetermined radius of an origin of the I-Q plane;
when the difference in phase is 180 degrees and a transition sample is positioned within the radius:
generating a dodging symbol;
inserting the dodging symbol into the transmission sequence to create a modified transmission sequence; and
sampling and filtering the modified transmission sequence to produce filtered samples; and
providing a filtered signal that includes the filtered samples for transmission to a receiver.

8. The method of claim 7, further comprising:
rotate the trajectory so that the trajectory is parallel to the I axis;
identifying the transition sample having the minimum distance from the Q axis; and
outputting the imaginary component of the identified transition sample as an estimate of the minimum distance between the origin and the trajectory of transition samples.

9. The method of claim 7, wherein the transmit symbols comprise coordinate pairs having a real component and an imaginary component, and wherein the method further comprises:
determining a first distance from the origin in which a dodging symbol oriented at 90 degrees with respect to the trajectory needs to be located to displace the filtered signal outside the radius;
determining a second distance from the origin in which a dodging symbol oriented at −90 degrees with respect to the trajectory needs to be located to displace the filtered signal outside the radius;
selecting an orientation of 90 degrees or −90 degrees that yields the smaller distance; and
outputting a dodging symbol having a magnitude of the smaller distance at the selected orientation.

10. The method of claim 9, further comprising adding a quantity corresponding to an effect of a prior dodging symbol to the first and second distances prior to selecting the orientation.

11. The method of claim 7, further comprising:
inserting samples of the dodging symbol into a sequence of samples of the transmission sequence to create the modified transmission sequence;
filtering the modified transmission sequence with a first filter; and
outputting the filtered modified transmission sequence as the filtered signal.

12. The method of claim 7, further comprising:
filtering samples of the transmission sequence with a first filter to produce a first output;
filtering samples of the dodging symbol with a second filter to produce a second output; and
combining the first output with the second output to produce the filtered signal.

13. A device comprising:
a first integrated circuit configured to:
receive a transmission sequence for transmission to a receiver, wherein the transmission sequence includes a sequence of transmit symbols, wherein each transmit symbol corresponds to a coordinate pair positioning the transmit symbol's phase on an I-Q plane;
determine whether a difference in phase between consecutive transmit symbols is 180 degrees;
in response to determining that the difference in phase is 180 degrees:
sample and filter the transmission sequence to create transition samples;

determine whether any transition sample is within a predetermined radius of an origin of the I-Q plane;

when the difference in phase is 180 degrees and a transition sample between a first transmit symbol and a second transmit symbol is positioned within the radius:

generate a dodging symbol;

insert the dodging symbol into the transmission sequence between the first transmit symbol and the second transmit symbol to create a modified transmission sequence; and produce filtered samples based, at least in part, on the modified transmission sequence; and create a filtered signal that includes the filtered samples;

a second integrated circuit configured to transmit the filtered signal.

14. The device of claim 13, wherein the first integrated circuit is configured to determine whether to generate a dodging symbol based, at least in part, on the height, the radius, and a residual effect of a prior dodging symbol.

15. The device of claim 13, wherein the first integrated circuit is configured to generate the dodging symbol by generating a dodging symbol that falls a distance from the origin that is a function of the radius and has a phase that is perpendicular to a trajectory of the transition samples.

16. The device of claim 13, wherein the first integrated circuit is configured to combine samples of the transmission sequence with samples of the dodging symbol to create the modified transmission sequence and then filter the modified transmission sequence to create the filtered signal.

17. The device of claim 13 wherein the first integrated circuit is configured to combine a filtered transmission sequence and a filtered sequence of dodging symbol samples to create the filtered signal.

\* \* \* \* \*